US009388747B2

(12) United States Patent  
Kato et al.

(10) Patent No.: US 9,388,747 B2  
(45) Date of Patent: Jul. 12, 2016

(54) AIRTIGHTNESS MAINTAINING STRUCTURE FOR BUTTERFLY VALVE

(71) Applicant: AISIN SEIKI KABUSHIKI KAISHA, Kariya-shi (JP)

(72) Inventors: Masayuki Kato, Kariya (JP); Masato Ishii, Kariya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 105 days.

(21) Appl. No.: 14/357,913

(22) PCT Filed: Nov. 22, 2012

(86) PCT No.: PCT/JP2012/080295  
§ 371 (c)(1),  
(2) Date: May 13, 2014

(87) PCT Pub. No.: WO2013/088933  
PCT Pub. Date: Jun. 20, 2013

(65) Prior Publication Data  
US 2014/0312258 A1    Oct. 23, 2014

(30) Foreign Application Priority Data

Dec. 14, 2011  (JP) ................................ 2011-273904

(51) Int. Cl.  
F16K 41/00   (2006.01)  
F02D 9/10    (2006.01)  
F16J 15/24   (2006.01)  
F16K 1/226   (2006.01)  
F02B 27/02   (2006.01)  
F02M 35/10   (2006.01)  
F16K 41/04   (2006.01)  
F16K 41/06   (2006.01)  
F16K 27/02   (2006.01)

(52) U.S. Cl.  
CPC ............ *F02D 9/106* (2013.01); *F02B 27/0247* (2013.01); *F02B 27/0273* (2013.01);  
(Continued)

(58) Field of Classification Search  
CPC . F16K 1/2268; F16K 41/003; F16K 27/0218; F16K 50/0285; F16K 5/0485; F16K 5/0694

USPC ............ 251/306, 308, 304, 305; 137/625.29, 137/599.11, 115.16, 115.18; 123/337, 123/190.17, 188.6, 188.8  
See application file for complete search history.

(56) References Cited

U.S. PATENT DOCUMENTS 5,127,661 A * 7/1992 Franson ................. F16J 15/164  
                                              277/552  
6,022,000 A   2/2000  Laulhe et al.  
(Continued)

FOREIGN PATENT DOCUMENTS

JP    54-142453 A   11/1979  
JP    60-3379 U     1/1985  
(Continued)

OTHER PUBLICATIONS

Notification of Transmittal of Translation of the International Preliminary Report on Patentability (Forms PCT/IB/338 and PCT/IB/373) and the Written Opinion of the International Search Authority (Form PCT/ISA/237) issued on Jun. 26, 2014, by the International Bureau of WIPO in corresponding International Application No. PCT/JP2012/080295. (5 pages).

(Continued)

*Primary Examiner* — John K Fristoe, Jr.  
*Assistant Examiner* — Paul Gray  
(74) *Attorney, Agent, or Firm* — Buchanan Ingersoll & Rooney PC

(57) ABSTRACT

An airtightness maintaining structure for a butterfly valve includes a valve element having a rotating shaft and a valve body, a rotation supporting portion having a pivotably supporting member that fits onto the rotating shaft and pivotably supports the rotating shaft, and a rotating shaft seal arranged to contact in a fitting state both an end surface of a member on an outer radial and a surface of a member on an inner side either the rotation shaft or the pivotably supporting member and has an annular portion. In a closed valve state of the valve element, the rotating shaft seal moves radially due to a pressure difference between a high fluid pressure acting on one side of the valve element and a low fluid pressure acting on the other side and contacts both the valve element and the rotation supporting portion on the high fluid pressure side.

15 Claims, 8 Drawing Sheets

(52) U.S. Cl.
CPC ... *F02M35/10065* (2013.01); *F02M 35/10255* (2013.01); *F16J 15/24* (2013.01); *F16K 1/226* (2013.01); *F16K 1/2261* (2013.01); *F16K 1/2268* (2013.01); *F16K 27/0218* (2013.01); *F16K 41/00* (2013.01); *F16K 41/046* (2013.01); *F16K 41/066* (2013.01); *Y02T 10/146* (2013.01)

(56) References Cited

U.S. PATENT DOCUMENTS

| 2003/0111036 A1 | 6/2003 | Nomura et al. |
| 2004/0055565 A1 | 3/2004 | Yamamoto et al. |
| 2011/0308640 A1 | 12/2011 | Hasegawa et al. |
| 2012/0132169 A1 | 5/2012 | Ishii et al. |

FOREIGN PATENT DOCUMENTS

| JP | 60-164174 U | 10/1985 |
| JP | 11-501714 A | 2/1999 |
| JP | 2003-184582 A | 7/2003 |
| JP | 2004-116357 A | 4/2004 |
| JP | 2005-133810 A | 5/2005 |

OTHER PUBLICATIONS

International Search Report (PCT/ISA/210) mailed on Dec. 18, 2012, by the Japanese Patent Office as the International Searching Authority for International Application No. PCT/JP2012/080295.

Written Opinion (PCT/ISA/237) mailed on Dec. 18, 2012, by the Japanese Patent Office as the International Searching Authority for International Application No. PCT/JP2012/080295.

\* cited by examiner

AIRTIGHTNESS MAINTAINING STRUCTURE FOR BUTTERFLY VALVE

TECHNICAL FIELD

The present invention relates to a structure in which the leakage of fluid from the periphery of a rotation supporting portion for supporting a rotating shaft of a butterfly valve is reduced to maintain airtightness.

BACKGROUND ART

An intake system having a port and a surge tank in a multiple cylinder internal combustion engine of a car or the like is provided with a partition that divides the inside of the surge tank into two sections and a butterfly valve is attached to a position in which, for example, a portion of the partition is cut out. A butterfly valve includes a valve element that is switched to a state where the two sections divided by the partition are in communication (hereinafter, referred to as an "open valve state") or a state where the two sections are partitioned (hereinafter, referred to as a "closed valve state") by a rotation, a valve body that supports the valve element, and a sealing material for sealing between the inner circumferential edge of the cut out portion of the partition and the outer circumferential edge of the valve body (for example, PTL 1).

The resonance frequency of the intake system is changed by switching the valve element to an open valve state or a closed valve state, and a supercharging effect can be obtained in wide operation ranges of the engine. If the leakage of the air between the two sections is increased in the closed valve state, the expected resonance frequency is not generated in the intake system of the engine and the supercharging effect is degraded, resulting in the deterioration of the performance of the engine.

In the intake control valve (butterfly valve) disclosed in PTL 1, a sealing material made of an elastic material is attached to the circumferential edge portion of a valve holder. When the valve holder is mounted in the partition, the sealing material fits onto a groove portion provided on the inner circumferential edge of the partition. Moreover, a rubber sealing material is attached to the outer circumferential edge portion of the valve element attached to the valve holder and seals a gap between the valve element and the valve holder in the closed valve state. Accordingly, the leakage of the air between the two sections is suppressed in the closed valve state.

CITATION LIST

Patent Literature

PTL 1: JP 2004-116357A

SUMMARY OF INVENTION

Technical Problem

However, it is difficult to fit the sealing material on an intake control valve (butterfly valve) also having a gap that causes the two sections to be in communication in the periphery of a valve shaft supporting portion in which the valve shaft is inserted into the valve holder. Therefore, a reduction of airtightness of the shaft portion is likely to occur resulting in the deterioration of the performance of the engine. Furthermore, since the gap in the valve is enlarged by a change in the dimensions caused by production errors of the valve or a change in temperature, resulting in a dominant factor of deterioration of the performance, the gap cannot be sealed sufficiently.

The present invention was made in view of the foregoing problems, and it is an object thereof that a butterfly valve in which the function of maintaining airtightness in a rotation supporting portion is improved is provided.

Solution to Problem

In order to achieve the above-described object, in an aspect of the present invention, the airtightness maintaining structure for a butterfly valve includes a valve element having a rotating shaft and a valve body, a rotation supporting portion having a pivotably supporting member that fits onto the rotating shaft and pivotably supports the rotating shaft and a rotating shaft seal that is arranged so as to be able to contact in a fitting state with both an end surface of a member on an outer side in a radial direction and a surface of a member on an inner side either the rotation shaft or the pivotably supporting member and has an annular portion, and, in a closed valve state of the valve element, the rotating shaft seal moves in the radial direction of the rotation shaft due to a difference of pressures between a high fluid pressure that acts on one side of the valve element and a low fluid pressure that acts on the other side thereof and contacts with both the valve element and the rotation supporting portion on the high fluid pressure side.

In this aspect of the present invention, the fluid moves from the high fluid pressure side to the low fluid pressure side, so that the force generated by the fluid acts on the rotating shaft seal. As a result, since the rotating shaft seal contacts with both the valve element and the rotation supporting portion on the high fluid pressure side and the gap is eliminated, the leakage of the fluid from the periphery of the rotation supporting portion for supporting the rotating shaft can be reduced to maintain airtightness.

In the airtightness maintaining structure for a butterfly valve according to one aspect of the present invention, it is preferable that the rotation supporting portion has a pair of partition plates in a direction parallel to the valve element in the closed valve state and on both ends in a radial direction of the pivotably supporting member, the rotating shaft seal has a pair of first locking portions that project from the annular portion and a pair of second locking portions that are arranged in parallel with the first locking portions with a predetermined interval on both ends in a radial direction of the annular portion, the rotating shaft seal is arranged such that the partition plates are interposed between the first locking portions and the second locking portions, and the portions on the high fluid pressure side either the first locking portions or the second locking portions contact with the partition plates when the rotating shaft seal contacts with the valve element and the rotation supporting portion on the high fluid pressure side.

With this configuration, since the partition plate is interposed between the first locking portion and the second locking portion, one of the locking portions can contact with the partition plate to maintain airtightness even when the high fluid pressure side is switched.

In the airtightness maintaining structure for a butterfly valve according to one aspect of the present invention, it is preferable that the pivotably supporting member is located on a more inner side in a radial direction than the rotating shaft in the fitting state, the pivotably supporting member has a tapered portion facing to the rotating shaft on its outer circumferential surface, and the rotating shaft seal contacts with the tapered portion and the end surface of the rotating shaft.

With this configuration, when closing the gap through which the fluid leaks, the rotating shaft seal moves along the tapered portion, and therefore, the rotating shaft seal can be caused to definitely and rapidly move in the axis direction and in the radial direction.

In the airtightness maintaining structure for a butterfly valve according to one aspect of the present invention, it is preferable that the rotating shaft is located on a more outer side in a radial direction than the pivotably supporting member in the fitting state, the rotating shaft seal has a first surface that contacts with the end surface of the rotating shaft by surface contact, and the first surface is perpendicular to the axis of the rotating shaft.

With this configuration, since the first surface is parallel to the direction in which the fluid flows, the pressing force of the rotating shaft seal against the end surface of the rotating shaft is released soon after the pressing of the rotating shaft seal by the high pressure fluid begins to be released, and the rotating shaft seal separates from the end surface of the rotating shaft soon after the valve element begins to rotate in an opening direction. Accordingly, since any sliding of the first surface and the end surface of the rotating shaft is not likely to occur, the rotating shaft seal can be used for a long time without being worn out.

In the airtightness maintaining structure for a butterfly valve according to one aspect of the present invention, it is preferable that the rotating shaft seal has a second surface that generates component forces in the axis direction of the rotating shaft and in a direction of movement in a radial direction, and the second surface is a tapered surface that is formed on an outer circumferential surface of the annular portion.

With this configuration, since the high fluid pressure can be changed to component forces in an axis direction and in a radial direction, the rotating shaft seal can be caused to definitely and rapidly move in the axis direction and in the radial direction.

In the airtightness maintaining structure for a butterfly valve according to one aspect of the present invention, it is preferable that the rotating shaft seal does not contact with at least the rotation supporting portion on the low fluid pressure side when the rotating shaft seal contacts with the valve element and the rotation supporting portion on the high fluid pressure side.

With this configuration, since the rotating shaft seal can move in a radial direction, the rotating shaft seal always moves to the optimum position even when the high fluid pressure side is switched, and therefore, airtightness can be definitely maintained.

In the airtightness maintaining structure for a butterfly valve according to one aspect of the present invention, it is preferable that the rotating shaft seal has a pair of first locking portions that project from the annular portion and a pair of second locking portions that are arranged in parallel with the first locking portion with a predetermined interval on both ends in a radial direction of the annular portion and has inner circumferential side flat surfaces between the first locking portions and the second locking portions on an inner circumferential surface of the annular portion, and the inner circumferential surface has a cross-section with an oval shape.

With this configuration, since the curvature of the rotating shaft seal when the first surface and the end surface are in surface contact can be corresponded with the curvature of the pivotably supporting member, the leakage of the fluid can be further reduced to maintain airtightness.

In the airtightness maintaining structure for a butterfly valve according to one aspect of the present invention, it is preferable that the end surface of the rotating shaft is a tapered surface facing to the pivotably supporting member, and the rotating shaft seal is provided between the tapered portion of the pivotably supporting member and the tapered surface of the rotating shaft.

In the present invention, the rotating shaft seal is provided between the tapered portion of the pivotably supporting member and the tapered surface of the rotating shaft. That is, at least a portion of the rotating shaft seal can be provided in a space formed between the tapered portion of the pivotably supporting member and the tapered surface of the rotating shaft. Accordingly, even if a relatively large rotating shaft seal is used to secure the sealing performance, a space, to be newly secured, in which the rotating shaft seal is mounted can be reduced.

DESCRIPTION OF EMBODIMENTS

First Embodiment

Figure 1:
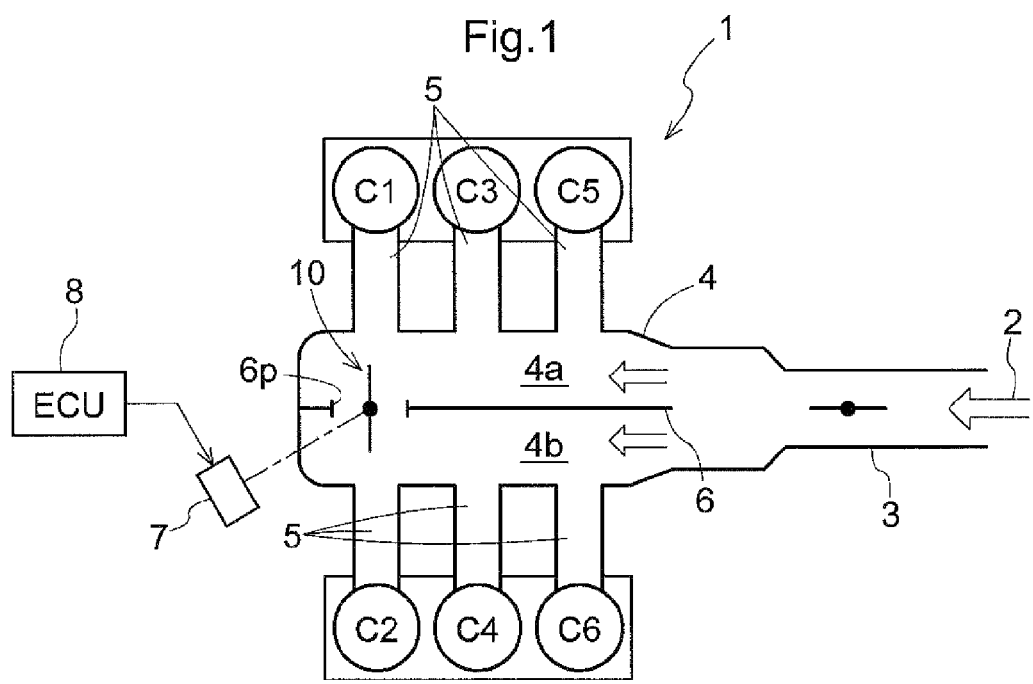
FIG. 1 is a schematic view of a configuration of an intake system using the airtightness maintaining structure for a butterfly valve according to a first embodiment.

Hereinafter, embodiments for implementing the present invention will be described with reference to the drawings. FIG. 1 is a schematic view illustrating the relation between an intake system 1 of a V-6 cylinder engine and six cylinders C1 to C6. The intake system 1 has an intake passage 3 into which fluid (air) 2 is supplied through an air filter (not shown) and a surge tank 4 that is in communication with the intake passage 3. The intake passage 3 is provided with a throttle valve. The surge tank 4 is divided into a first surge section 4a and a second surge section 4b by a partition 6. In the first surge section 4a shown in the upper part of FIG. 1, the cylinder C1, cylinder C3 and cylinder C5 extend via intake pipes 5, and in the second surge section 4b shown in the lower part, the cylinder C2, cylinder C4 and cylinder C6 extend via the intake pipes 5.

Figure 2:
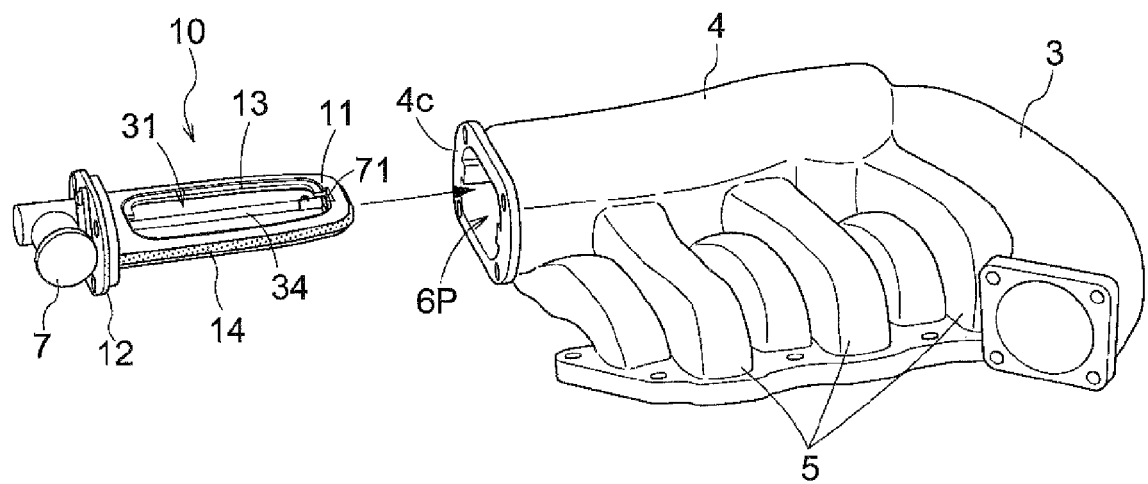
FIG. 2 is a perspective view illustrating a specific shape of the intake system according to the first embodiment.

FIG. 2 is a perspective view illustrating a specific shape of the intake system 1. A portion of the partition 6 is open as a fluid passage 6P, and a butterfly valve 10 is attached to the fluid passage 6P by hermetically fastening a valve side mounting frame 12 to a tank side mounting frame 4c. When the engine is operated, as shown in FIG. 1, the fluid 2 is supplied to the first surge section 4a and the second surge section 4b through the intake passage 3 and the three cylinders C1, C3 and C5, and the three cylinders C2, C4 and C6 alternately take in the air. Accordingly, in a closed valve state of the butterfly valve 10, an atmospheric pressure (high fluid pressure) and a negative pressure (low fluid pressure) are alternately generated in the first surge section 4a and the second surge section 4b flanking the partition 6.

Figure 3:
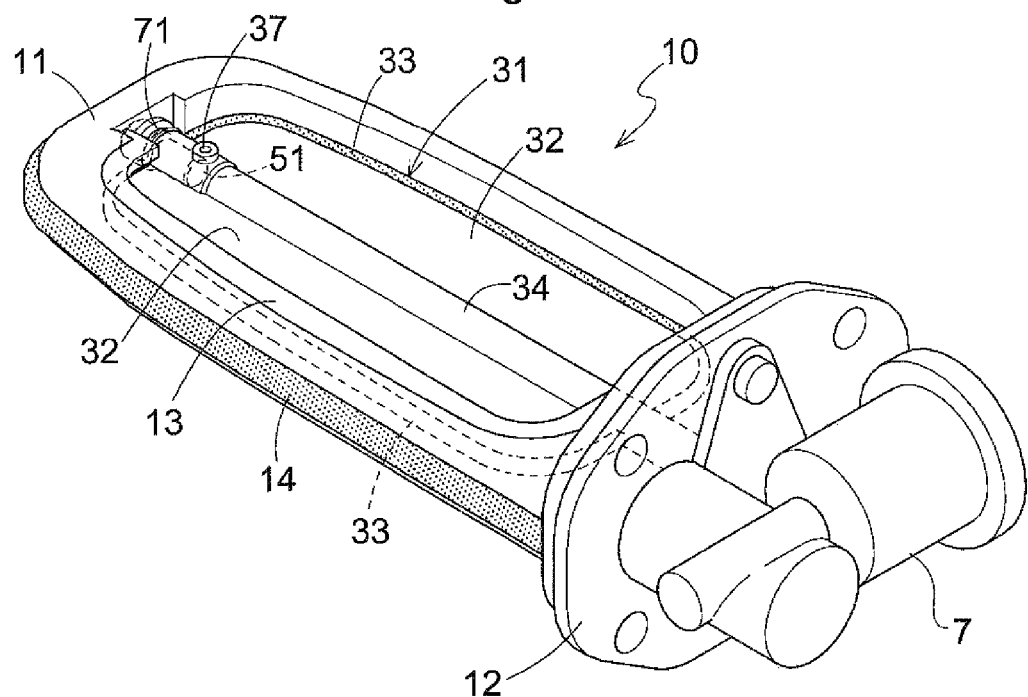
FIG. 3 is a perspective view of a configuration of the butterfly valve according to the first embodiment.

FIG. 3 is a perspective view of a configuration of the butterfly valve 10. The butterfly valve 10 has a body 11 that is fitted to the fluid passage 6P of the partition 6 and a valve element 31 that is supported by a rotating shaft 34. The rotating shaft 34 is pivotably supported by portions of the body 11 at both ends. The body 11 has a window frame shape extending around the circumference of the cut-out portion of the partition 6, and a body seal 14 is attached to the outer circumference thereof for maintaining airtightness between the body 11 and the partition 6 at the cut-out portion.

Figure 4:
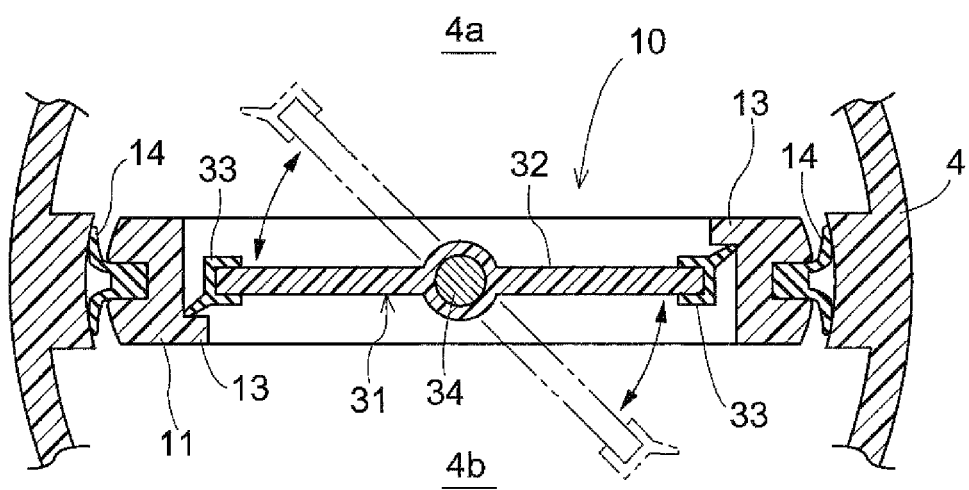
FIG. 4 is a cross-sectional view illustrating an open valve state and a closed valve state of the butterfly valve according to the first embodiment.

A stopper 13 that controls the rotation of the valve element 31 is formed on the inner surface of the body 11. The stopper 13 extends substantially around the inner circumference of the body 11. FIG. 4 is a cross-sectional view illustrating an open valve state and a closed valve state of the butterfly valve 10.

As shown in FIGS. 3 and 4, the stoppers 13 are formed on opposite sides in a thickness direction of the body 11 and extend around their respective halves of the circumference. In FIG. 4, a closed valve state of the valve element 31 is indicated by solid lines, and the open valve state is indicated by long dashed double-short dashed lines.

The valve element 31 includes the rotating shaft 34, a valve body 32 made of resin, which has a plate shape and is attached to the rotating shaft 34, and a valve element seal 33 made of rubber or the like, which is arranged on the circumferential edge of the valve body 32. When the valve is closed, the valve element 31 rotates and stops when being parallel to the body 11. At that time, the valve element seal 33 is pressed to the bottom surface of the stopper 13, so that there is no gap between the valve element seal 33 and the stopper 13, and therefore, a closed valve state (in which airtightness between the valve element 31 and the body 11 is maintained) is achieved.

The valve element 31 of the butterfly valve 10 can be switched to the open valve state or the closed valve state by the rotation with an actuator 7. The resonance frequency of the intake system 1 is changed by switching the valve element 31 to the open valve state or the closed valve state, and a supercharging effect can be obtained in wide operation ranges of the engine to increase the engine output. An electric control type actuator that is driven with electric signals sent from an ECU 8 shown in FIG. 1 can be used as the actuator 7.

Figure 5:
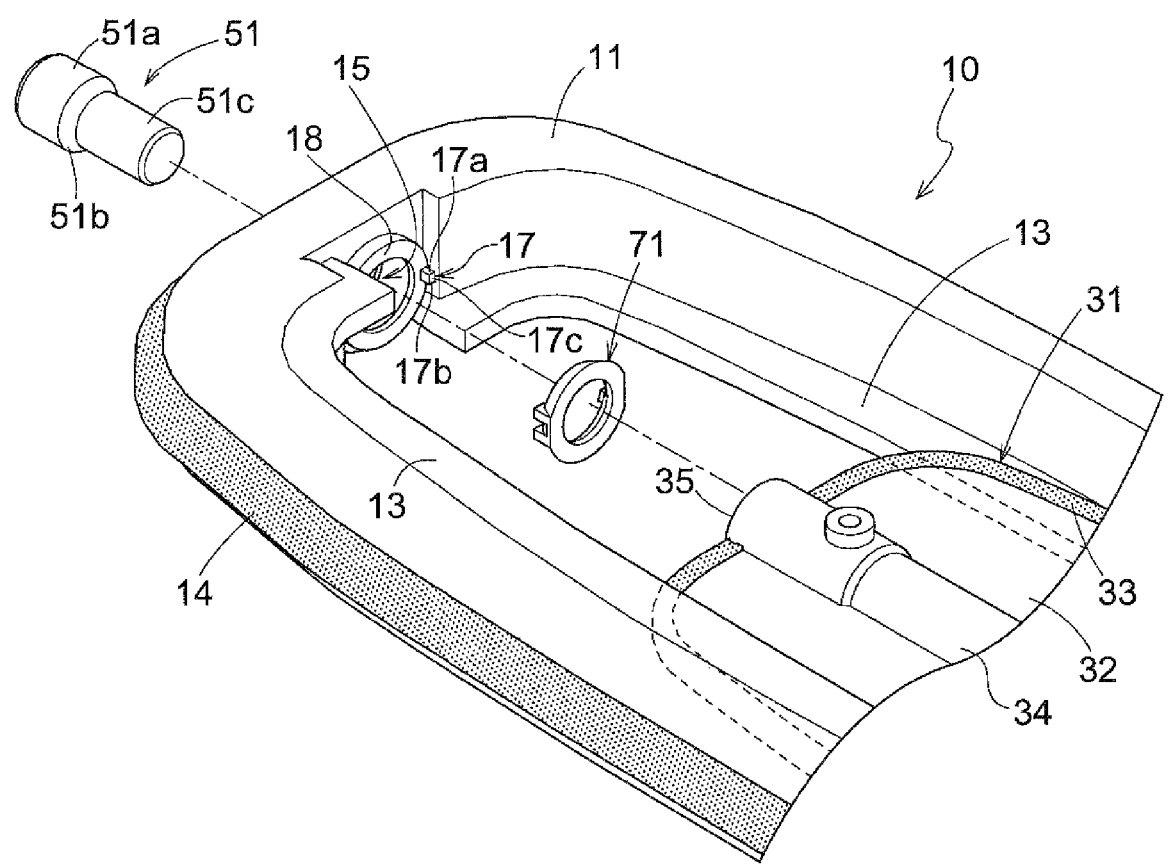
FIG. 5 is a partially exploded view of the butterfly valve according to the first embodiment.
Figure 7A:
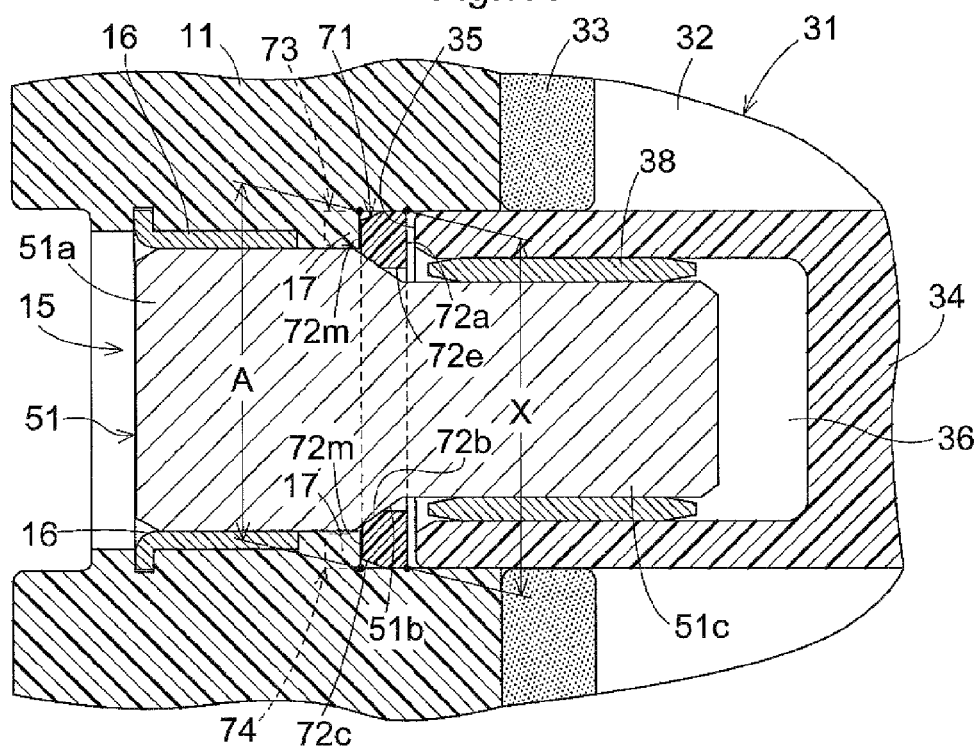
FIG. 7A is a cross-sectional view illustrating a state of the rotating shaft seal when there is no difference between the pressure in a first surge section and the pressure in a second surge section.
Figure 7B:
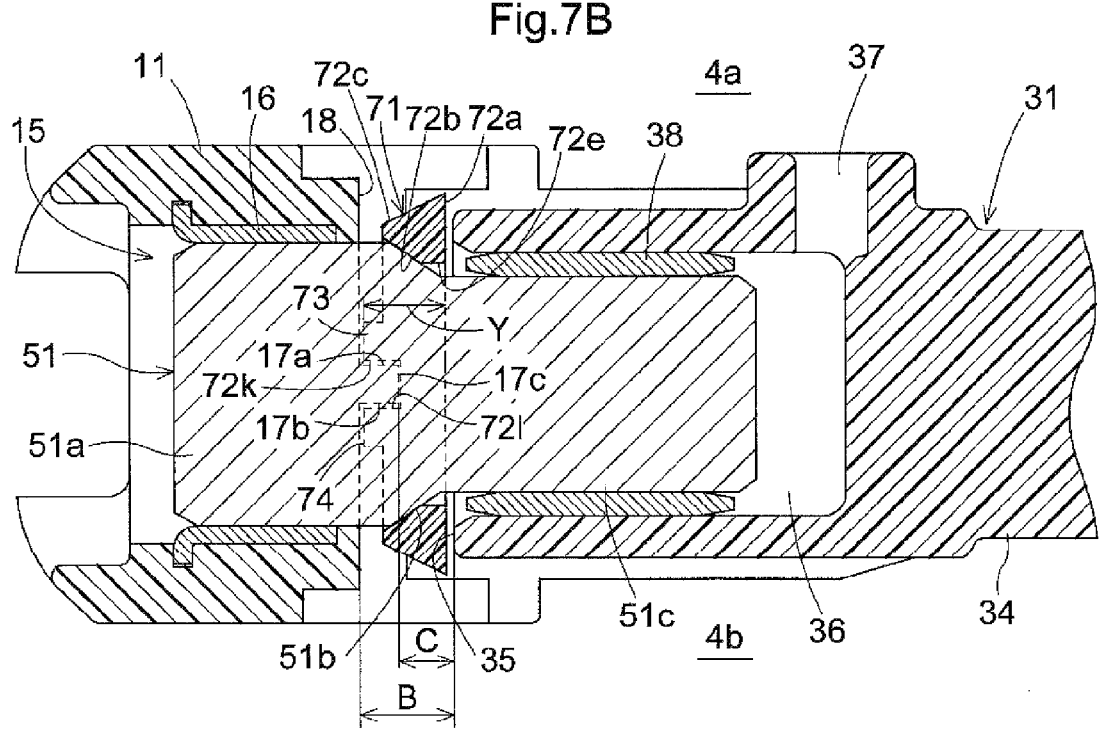
FIG. 7B is a cross-sectional view illustrating a state of the rotating shaft seal when there is no difference between the pressure in the first surge section and the pressure in the second surge section.

FIG. 5 is a partially exploded view of the butterfly valve 10. FIG. 7B is a cross-sectional view illustrating a state where the butterfly valve 10 is cut in a perpendicular direction with respect to the valve element 31 in the closed valve state while including the axis of the rotating shaft 34. As shown in FIGS. 7A and 7B, the end portion of the rotating shaft 34 on the side where the actuator 7 is not arranged is a hollow hole 36 with a circular cross-section and an end surface 35 is perpendicular to the axis. A sliding bearing 38 is press-fitted to the end portion of the rotating shaft 34 so as not to protrude from the end surface 35 of the rotating shaft 34. An air vent 37 that is in communication with the outside is opened in the bottom portion of the hollow hole 36.

A through hole 15 with a circular cross-section is opened in the end portion on the body 11 side that faces the end surface 35 of the rotating shaft 34. The inner diameter of the through hole 15 is larger than that of the sliding bearing 38. A pair of partitions 17 integrally formed with the body 11 on both ends in a radial direction of the through hole 15 project from a through hole end surface 18 inside the body 11 of the through hole 15 toward the inside of the body 11. The pair of partitions 17 are formed on a plane including the axis of the through hole 15 and parallel to the valve element 31 in the closed valve state. A tubular metal bush 16 is press-fitted to the inner circumferential surface of the through hole 15 from the outside of the body 11.

A pivotably supporting member 51 is inserted from the outside of the body 11 in order to pivotably support the valve element 31 with the body 11. The pivotably supporting member 51 is a metal component including a press-fitting portion 51a that is a columnar portion with a large diameter, a fitting portion 51c that is a columnar portion with a small diameter, and a tapered portion 51b that connects the press-fitting portion 51a and the fitting portion 51c. The press-fitting portion 51a has such a diameter that the pivotably supporting member 51 can be press-fitted and fixed to the inner diameter of the metal bush 16, and the fitting portion 51c has such a size that the sliding bearing 38 can rotate smoothly.

The pivotably supporting member 51 is inserted with the fitting portion 51c facing frontward. After the pivotably supporting member 51 passes through the through hole 15 and then, the rotating shaft seal 71, the fitting portion 51c is fitted to the sliding bearing 38. When the fitting portion 51c is fitted thereto, the air vent 37 can let out the air inside, and therefore, the fitting portion 51c can be smoothly fitted thereto. The press-fitting portion 51a is press-fitted to the metal bush 16 at the same time as when the fitting portion 51c is fitted to the sliding bearing 38. Thereby, the valve element 31 is pivotably supported by the body 11. The rotating shaft seal 71, which is made of resin such as type 6 nylon, is a component for reducing a gap between the rotating shaft 34 and the body 11 (hereinafter, referred to as "sealing") to reduce the leakage of the fluid 2. A combination of the body 11 and the pivotably supporting member 51 is an example of the "rotation supporting portion" described in the claims.

Figure 6A:
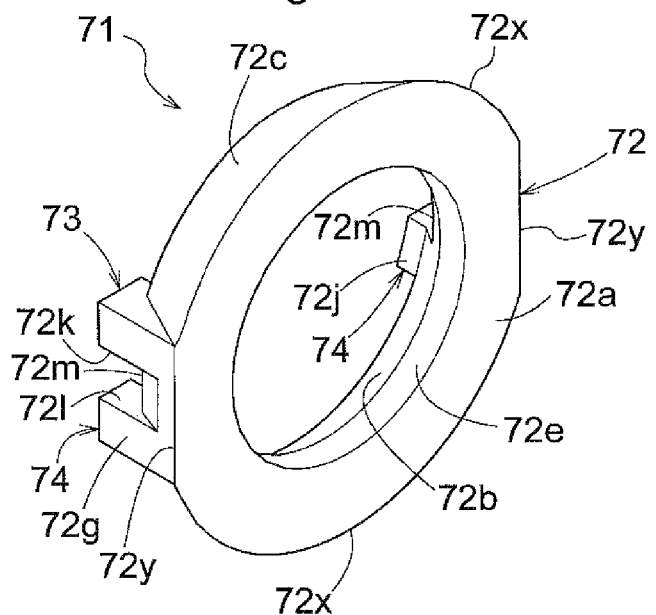
FIG. 6A is a perspective view of a rotating shaft seal according to the first embodiment.
Figure 6B:
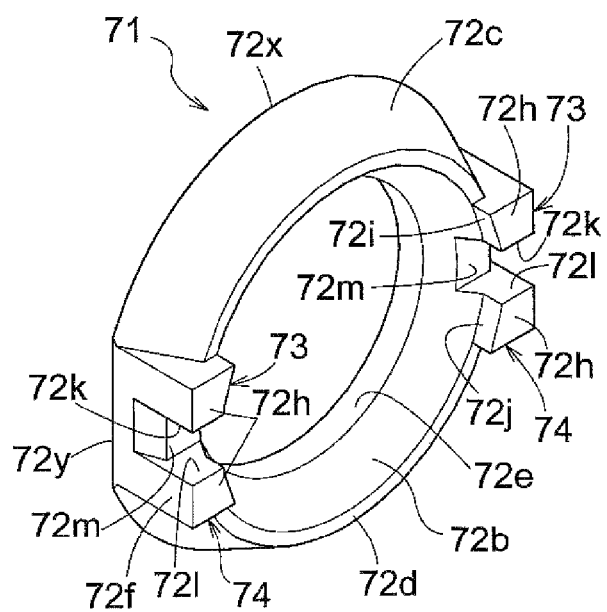
FIG. 6B is a perspective view of a rotating shaft seal according to the first embodiment.

FIGS. 6A and 6B are perspective views of the rotating shaft seal 71. The rotating shaft seal 71 includes an annular portion 72, a pair of first locking portions 73 projecting from both ends in a radial direction of the annular portion 72, and a pair of second locking portions 74 projecting from both ends in a radial direction of the annular portion 72 at predetermined intervals from the pair of first locking portions 73. The cross-section when the annular portion 72 is cut at a plane that crosses the axis of the rotating shaft seal 71 has a pentagonal shape. The annular portion 72 includes a first surface 72a that is perpendicular to the axis of the rotating shaft seal 71, a third surface 72b that is a surface on the inner circumferential side of the annular portion 72 and inclines in the tapered state with respect to the axis, a second surface 72c that is a surface on the outer circumferential side of the annular portion 72 and inclines in the tapered state in the opposite direction to the third surface 72b with respect to the axis, a fourth surface 72d that is located between the third surface 72b and the second surface 72c and is perpendicular to the axis, and a fifth surface 72e that is located between the first surface 72a and the third surface 72b and is parallel to the axis.

The inner diameter of the fifth surface 72e is larger than the diameter of the fitting portion 51c of the pivotably supporting member 51, and smaller than the diameter of the press-fitting portion 51a. The diameter of the intersection line of the third surface 72b and the fourth surface 72d is slightly larger than the diameter of the press-fitting portion 51a. As viewed in an axis direction, the inner circumferential side of the first surface 72a (boundary between the first surface 72a and the fifth surface 72e) has a circular shape and the outer circumferential side (boundary between the first surface 72a and the second surface 72c) has a shape formed with two arc portions 72x that have the same center as the circle on the inner circumferential side and have the same length and two linear portions 72y that have the same length and are parallel to each other. One first locking portion 73 of the pair of first locking portions 73 and one second locking portion of the pair of second locking portions 74 include one linear portion 72y and are arranged perpendicular to the first surface 72a and in a direction of the fourth surface 72d (hereinafter, referred to as a "projecting direction") with a predetermined interval. In the same manner, the other first locking portion 73 and the other second locking portion include the other linear portion 72y and are arranged perpendicular to the first surface 72a and in a direction of the fourth surface 72d with a predetermined interval.

Hereinafter, a surface that constitutes a portion of one first locking portion 73 and a portion of one second locking portion 74, includes one linear portion 72y and extends in the projecting direction is referred to as a sixth surface 72f. A surface that constitutes a portion of the other first locking portion 73 and a portion of the other second locking portion 74, includes the other linear portion 72y and extends in the projecting direction is referred to as a seventh surface 72g. Four surfaces that are portions of the surfaces constituting the pair of first locking portions 73 and the pair of second locking portions 74 and are parallel to the first surface 72a are collectively referred to as eighth surfaces 72h. All the distances between the first surface 72a and the respective eighth surfaces 72h are the same, and longer than the distance between the first surface 72a and the fourth surface 72d.

Two curved surfaces that are on the inner circumferential side of the pair of first locking portions 73, intersect with the intersection line of the third surface 72b and the fourth surface 72d and are parallel to the axis are collectively referred to as ninth surfaces 72i. Two curved surfaces that are on the inner circumferential side of the pair of second locking portions 74, intersect with the intersection line of the third surface 72b and the fourth surface 72d and are parallel to the axis are collectively referred to as tenth surfaces 72j.

A pair of surfaces that are portions of surfaces constituting the pair of first locking portions 73 and face the second locking portions 74 are referred to as eleventh surfaces 72k. A pair of surfaces that are portions of surfaces constituting the pair of second locking portions 74 and face the pair of eleventh surfaces 72k are referred to as twelfth surfaces 72l. The pair of eleventh surfaces 72k and the pair of twelfth surfaces 72l are parallel to each other.

A pair of thirteenth surfaces 72m that are perpendicular to the eleventh surfaces 72k and the twelfth surfaces 72l and to which the distances from the first surface 72a are shorter than the distance from the first surface 72a to the fourth surface 72d are formed between the eleventh surface 72k and the twelfth surface 72l that face each other between the pair of eleventh surfaces 72k and the pair of twelfth surfaces 72l. Both end portions on the inner circumferential sides of the pair of thirteenth surfaces 72m intersect with the third surface 72b and both end portions on the outer circumferential sides thereof are beveled.

The pivotably supporting member 51 is penetrated into the rotating shaft seal 71 in such a direction that the first surface 72a faces the end surface 35 of the rotating shaft 34. When the press-fitting portion 51a is press-fitted to the metal bush 16, as shown in FIG. 7B, the rotating shaft seal 71 is arranged such that the partition plate 17 is inserted into the gap that is formed by the eleventh surface 72k, the thirteenth surface 72m and the twelfth surface 72l and is placed therebetween, and the tapered portion 51b and the third surface 72b face each other. The taper of the tapered portion 51b and the taper of the third surface 72b have the same inclination. It should be noted that, as described above, the circle formed by the intersection line of the third surface 72b and the fourth surface 72d has a larger diameter than the press-fitting portion 51a, and therefore, the ninth surfaces 72i and the tenth surfaces 72j also have a larger diameter than that of the press-fitting portion 51a.

FIGS. 7A and 7B are cross-sectional views illustrating a state of the rotating shaft seal 71 when there is no difference between the pressure in the first surge section 4a and the pressure in the second surge section 4b. FIG. 7A is a cross-sectional view, as viewed from the first surge section 4a, illustrating a state where the butterfly valve 10 is cut in a parallel direction with respect to the valve element 31 in the closed valve state while including the axis of the rotating shaft 34, and FIG. 7B is a cross-sectional view illustrating a state where the butterfly valve 10 is cut in a perpendicular direction with respect to the valve element 31 in the closed valve state while including the axis of the rotating shaft 34. The upper part of FIG. 7B shows the first surge section 4a and the lower part thereof shows the second surge section 4b. In FIG. 7A, when the distance between the sixth surface 72f and the seventh surface 72g is referred to as X and the maximum width between the pair of partition plates 17 is referred to as A, the relation X=A is satisfied and therefore, the rotating shaft seal 71 has a structure in which the end portions in a width direction (in a vertical direction in FIG. 7A) of the pair of partition plates 17 are sealed to prevent the fluid 2 from leaking.

In FIGS. 7A and 7B, there is a gap between the first surface 72a and the end surface 35, and the fluid 2 freely flows between the first surge section 4a and the second surge section 4b through this gap. In FIG. 7B, when surfaces of the pair of partition plates 17 that face the pair of eleventh surfaces 72k of the pair of first locking portions 73 are referred to as partition plate upper surfaces 17a and surfaces of the pair of partition plates 17 that face the pair of twelfth surfaces 72l of the pair of second locking portions 74 are referred to as partition plate lower surfaces 17b, there are also gaps between the eleventh surfaces 72k and the partition plate upper surfaces 17a, which are indicated by dashed lines, and between the twelfth surfaces 72l and the partition plate lower surfaces 17b, which are indicated by dashed lines. The fluid 2 freely flows between the first surge section 4a and the second surge section 4b through these gaps as well.

In FIG. 7B, surfaces of the pair of partition plates 17 that are the closest to the end surface 35 of the rotating shaft 34 are referred to as a pair of partition plate end surfaces 17c. When the distance between the end surface 35 and the through hole end surface 18 is referred to as B, the distance between the end surface 35 and the partition plate end surface 17c is referred to as C and the distance between the first surface 72a and the eighth surface 72h is referred to as Y, the relation C<Y<B is satisfied. Accordingly, although the rotating shaft seal 71 can move in the axis direction between the end surface 35 and the through hole end surface 18, the pair of partition plates 17 are maintained in a state of being interposed between the pair of first locking portions 73 and the pair of second locking portions 74.

Figure 8A:
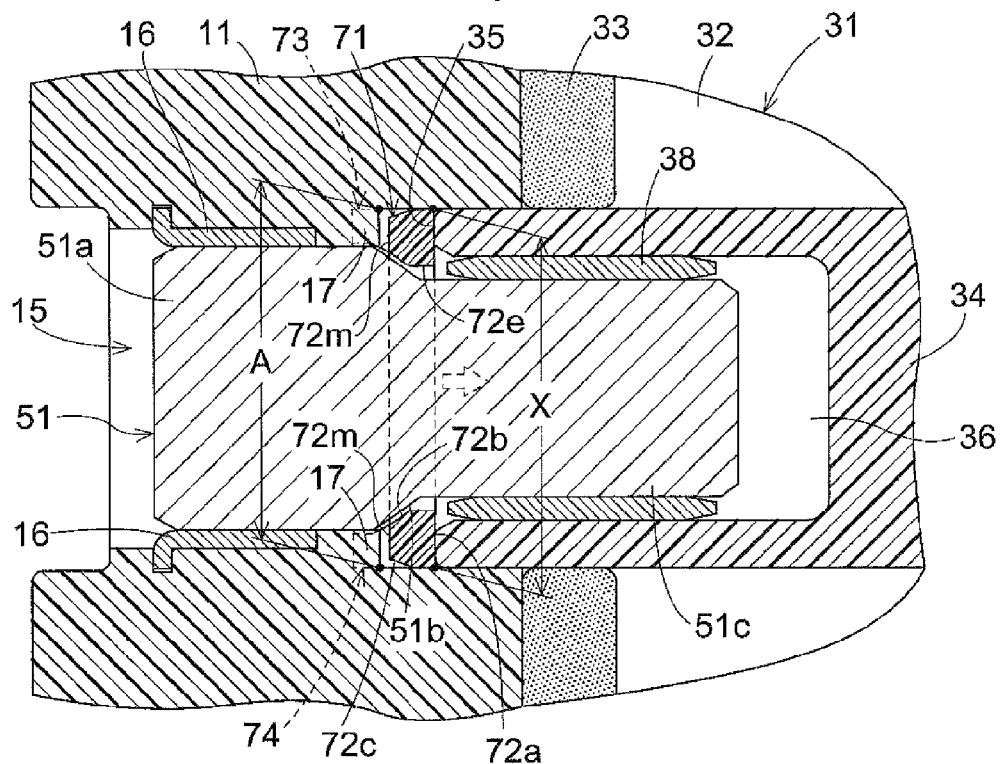
FIG. 8A is a cross-sectional view illustrating a state of the rotating shaft seal when the fluid pressure in the first surge section becomes high and the fluid pressure in the second surge section becomes low.
Figure 8B:
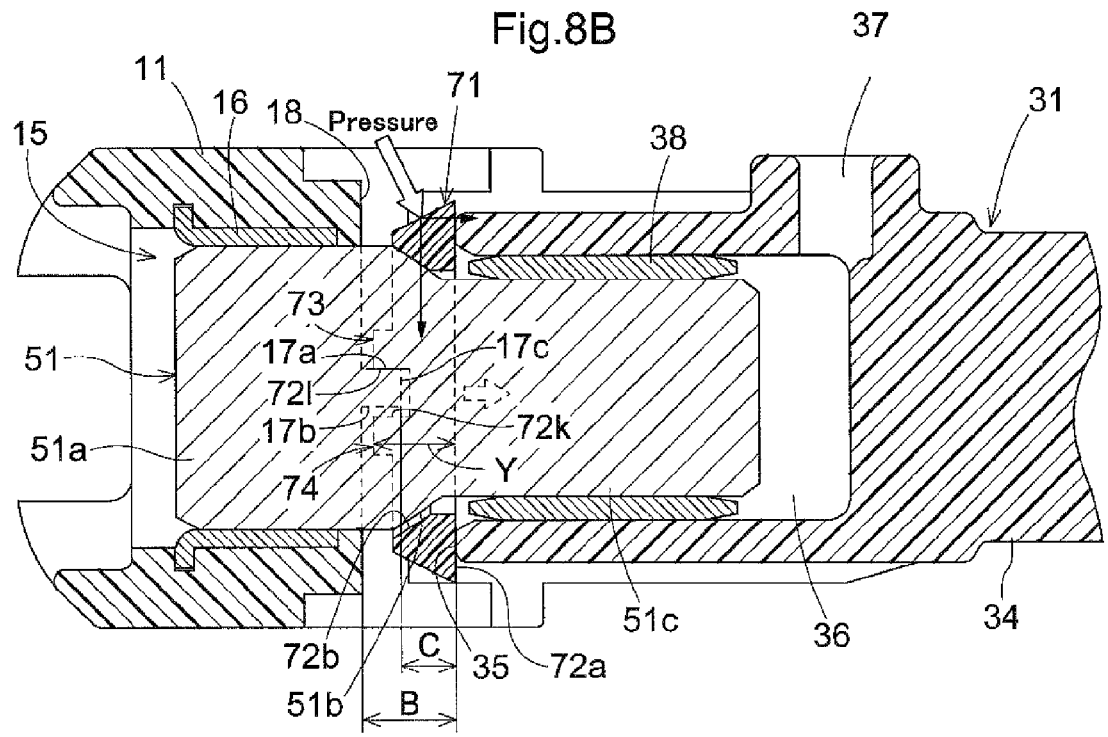
FIG. 8B is a cross-sectional view illustrating a state of the rotating shaft seal when the fluid pressure in the first surge section becomes high and the fluid pressure in the second surge section becomes low.

FIGS. 8A and 8B are cross-sectional views illustrating a state of the rotating shaft seal 71 when the fluid pressure in the first surge section 4a becomes high and the fluid pressure in the second surge section 4b becomes low. FIG. 8A is a cross-sectional view, as viewed from the first surge section 4a, illustrating a state where the butterfly valve 10 is cut in a parallel direction with respect to the valve element 31 in the closed valve state while including the axis of the rotating shaft 34, and FIG. 8B is a cross-sectional view illustrating a state where the butterfly valve 10 is cut in a perpendicular direction with respect to the valve element 31 in the closed valve state while including the axis of the rotating shaft 34. The upper part of FIG. 8B shows the first surge section 4a and the lower part thereof shows the second surge section 4b. As shown in FIG. 8B, when the fluid pressure in the first surge section 4a becomes high and the fluid pressure in the second surge section 4b becomes low, first, the fluid 2 flows from the first surge section 4a to the second surge section 4b. At that time, the second surface 72c of the rotating shaft seal 71 receives the pressure of the flowing fluid 2. The second surface 72c is an inverted tapered surface facing from the fourth surface 72d to the first surface 72a. Therefore, a component force in the axis direction (to the right in the drawing) and a component force in a radial direction (downward in the drawing) are generated from the pressure received by the second surface 72c. With these component forces, the rotating shaft seal 71 moves in the axis direction and in a radial direction, and the first surface 72a and the end surface 35 are brought into surface contact, so that the gap is eliminated and sealed. Also, the pair of eleventh surfaces 72k and the pair of partition plate upper surfaces 17a are brought into surface contact, and the gaps are sealed. Since the gaps are sealed by surface contact, the leakage of the fluid 2 can be definitely reduced.

As described above, while the engine is operated, a state where the fluid pressure is high and a state where the fluid pressure is low are alternately generated in the first surge section 4a and the second surge section 4b. When the fluid pressure in the second surge section 4b becomes high and the fluid pressure in the first surge section 4a becomes low on the contrary to FIGS. 8A and 8B, the pressure from below pushes up the rotating shaft seal 71 in FIG. 8B. Accordingly, the pair of twelfth surfaces 72l and the pair of partition plate lower surfaces 17b, which are indicated by dashed lines, are brought into surface contact, and the gap is eliminated and sealed. There is no change in that the first surface 72a and the end surface 35 are brought into surface contact and the gap is eliminated. Thus, even when a state where the fluid pressure is high and a state where the fluid pressure is low are alternately generated in the first surge section 4a and the second surge section 4b, the rotating shaft seal 71 receives the high fluid pressure and moves to automatically serve to reduce the leakage of the fluid 2.

However, in FIG. 8A, there are gaps between the press-fitting portion 51a and the ninth surface 72i and between the tapered portion 51b and the third surface 72b. This is because, as described above, the circle formed by the intersection line of the third surface 72b and the fourth surface 72d has a larger diameter than the press-fitting portion 51a, and therefore, in a state shown in FIG. 8A, the press-fitting portion 51 has a larger curvature than the ninth surface 72i and the tapered portion 51b has a larger curvature than the third surface 72b. Accordingly, as shown by the rotating shaft seal 71 on the first surge section 4a in FIG. 8B, only a portion of the third surface 72b comes into contact with the tapered portion 51b. Although the fluid 2 leaks into the second surge section 4b through this gap, there is no problem in product specifications because the gap is minute.

Figure 9A:
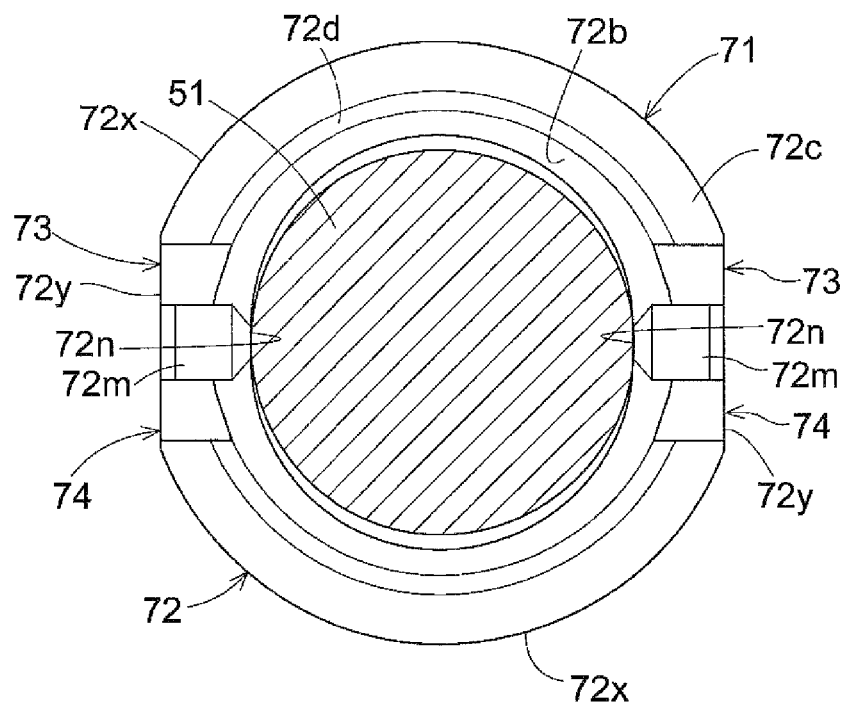
FIG. 9A is a cross-sectional view of the rotating seal member having a flat surface on the inner circumferential side.
Figure 9B:
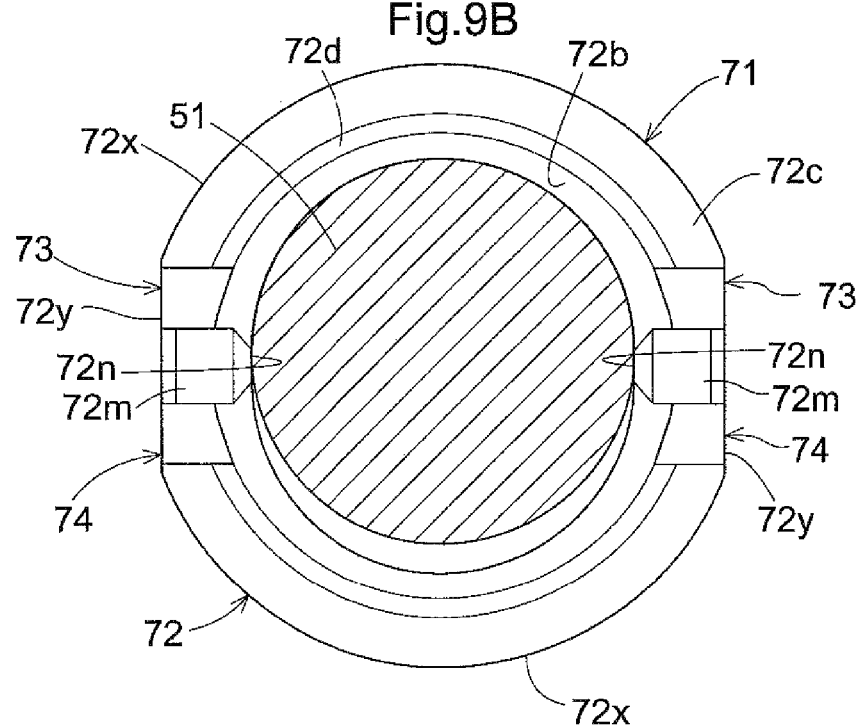
FIG. 9B is a cross-sectional view of the rotating seal member having a flat surface on the inner circumferential side.

When it is necessary to reduce the gaps due to the specifications, the diameter of the circle formed by the intersection line of the third surface 72b and the fourth surface 72d is reduced, so that the curvature of the ninth surface 72i approaches that of the press-fitting portion 51a and the curvature of the third surface 72b approaches that of the tapered portion 51b. In order to thoroughly eliminate the gaps, as shown in FIGS. 9A and 9B, the annular portion 72 of the rotating shaft seal 71 is made so as to have a cross-section with not a circular shape but an oval shape. Specifically, portions of the third surfaces 72b that the thirteenth surfaces 72m reach in the inner circumferential direction and portions of the fifth surface 72e between the eleventh surface 72k and the twelfth surface 72l are formed into a pair of inner circumferential side plane surfaces 72n. In addition, as shown in FIG. 9B, the third surface 72b and the tapered portion 51b are made to have the same curvature in a state where the first surface 72a and the end surface 35 are in contact with each other, so that the whole of them are brought into surface contact.

When, for example, the valve element 31 opens from the state shown in FIGS. 8A and 8B and the difference between the pressure in the first surge section 4a and the pressure in the second surge section 4b is eliminated, the rotating shaft seal 71 returns to the state shown in FIGS. 7A and 7B. At that time, the first surface 72a and the end surface 35 are parallel to the direction in which the fluid 2 flows, and therefore, they separate from each other soon after the fluid 2 begins to flow. Accordingly, when the valve element 31 rotates, any sliding of the first surface 72a and the end surface 35 is not likely to occur and can be ignored.

This embodiment uses resin materials such as type 6 nylon as the rotating shaft seal 71, but the materials for the rotating shaft seal 71 is not limited to the resin materials. Elastic materials such as rubber, metal materials or the like can be selected as appropriate depending on the material for the valve element 31 or the pivotably supporting member 51. When elastic materials are used for the rotating shaft seal 71, the curvature of the third surface 72b is changed by the high fluid pressure so as to correspond with the curvature of the tapered portion 51b, and therefore, it is possible to prevent the fluid 2 from leaking from the tapered portion 51b.

In this embodiment, the pivotably supporting member 51 has the tapered portion 51b and the rotating shaft 34 has the end surface 35, but a rotating shaft side may have a taper and a pivotably supporting member side may have an end surface.

In this case, a rotating member seal may be attached to the rotating shaft side to rotate with the valve element 31.

Second Embodiment

Figure 10A:
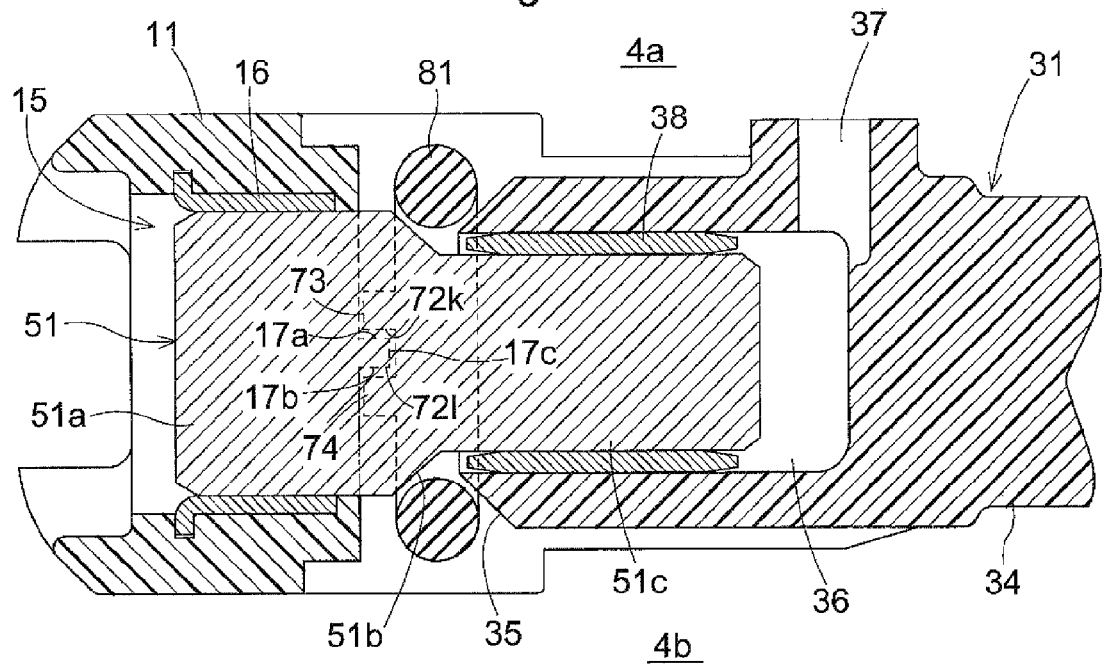
FIG. 10A is a cross-sectional view illustrating a state of the rotating shaft seal when there is no difference between the pressure in a first surge section and the pressure in a second surge section in the rotating shaft seal according to a second embodiment.
Figure 10B:
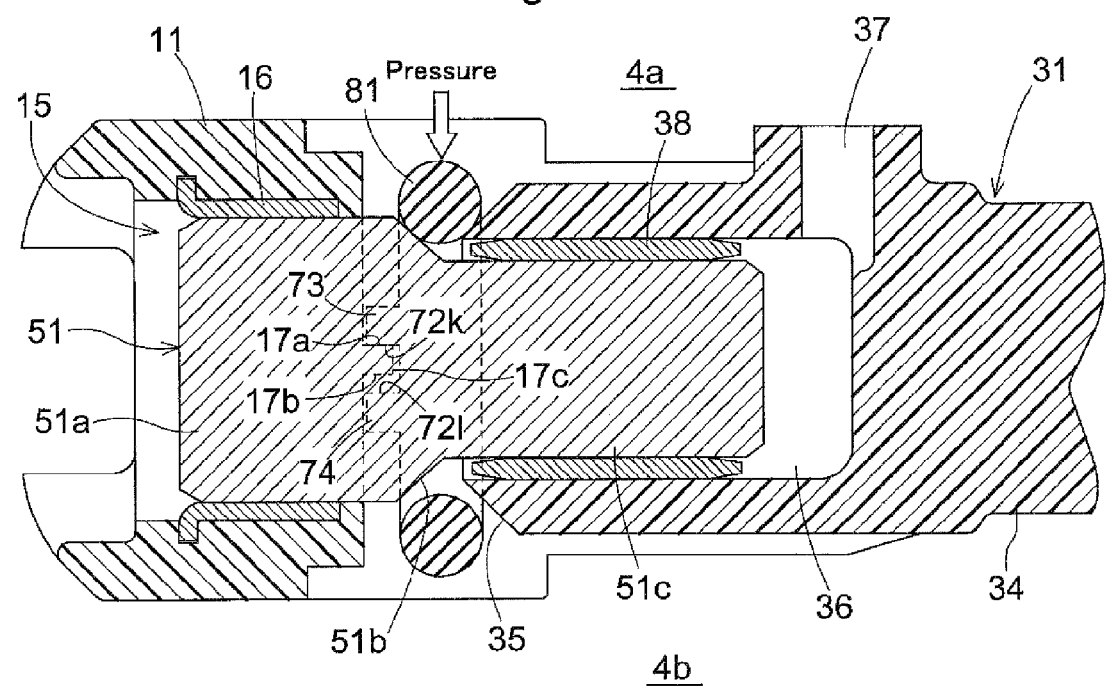
FIG. 10B is a cross-sectional view illustrating a state of the rotating shaft seal when the fluid pressure in the first surge section becomes high and the fluid pressure in the second surge section becomes low in the rotating shaft seal according to the second embodiment.

FIGS. 10A and 10B show a second embodiment of the present invention. FIG. 10A is a cross-sectional view illustrating a state of the rotating shaft seal 81 when there is no difference between the pressure in a first surge section 4a and the pressure in a second surge section 4b. FIG. 10B is a cross-sectional view illustrating a state of the rotating shaft seal 81 when the fluid pressure in the first surge section 4a becomes high and the fluid pressure in the second surge section 4b becomes low. In this embodiment, the same description as in the first embodiment has been omitted. A rotating shaft seal 81 of this embodiment is different from the rotating shaft seal 71 of the first embodiment in that the cross-section obtained by cutting the rotating shaft seal 81 at a plane that crosses the central axis thereof has a circular shape. This is because, in this embodiment, not only the pivotably supporting member 51 has the tapered portion 51b but also the end surface 35 of the rotating shaft 34 is a tapered surface, and therefore, both gaps can be definitely sealed by the rotating shaft seal with a circular cross-section in order to close them at the same time.

In FIG. 10A, since there is no difference between the pressure in the first surge section 4a and the pressure in the second surge section 4b, the rotating shaft seal 81 has a gap between the tapered portion 51b and the end surface 35. When the fluid pressure in the first surge section 4a becomes high and the fluid pressure in the second surge section 4b becomes low from this state, as shown in FIG. 10B, the rotating shaft seal 81 moves in a radial direction by the fluid flowing into the gap and contacts with the tapered portion 51b and the end surface 35. When the rotating shaft seal with a circular cross-section is used, by selecting a suitable diameter, the gap between the rotating shaft seal and the tapered portion 51b and the gap between the rotating shaft seal and the end surface 35 can be sealed at the same time only by the movement of the rotating shaft seal in a radial direction (in a vertical direction in the drawing) to maintain the airtightness of the first surge section 4a. By the movement of the rotating shaft seal 81 in a radial direction, the pair of eleventh surfaces 72k and the pair of partition plate upper surfaces 17a, which are indicated by dashed lines, are brought into surface contact at the same time, and therefore, the gaps are eliminated and sealed.

INDUSTRIAL APPLICABILITY

The present invention can be used for a structure in which the leakage of fluid from the periphery of a rotation supporting portion for supporting a rotating shaft of a butterfly valve is reduced to maintain airtightness.

REFERENCE SIGNS LIST

10 Butterfly valve
17 Partition plate
31 Valve element
32 Valve body
34 Rotating shaft
35 End surface
51 Pivotably supporting member
71, 81 Rotating shaft seal
72 Annular portion
72a First surface
72b Third surface
72c Second surface
72n Inner circumferential side flat surface
73 First locking portion

The invention claimed is:

1. An airtightness maintaining structure for a butterfly valve comprising:
  a partition including an opening configured for fluid passage;
  a valve element including a rotating shaft and a valve body, the valve element being rotatably attached to the partition via the rotating shaft, the valve body being configured to switch the opening between an open valve state and a closed valve state by rotating with the rotating shaft;
  a rotation supporting portion having a pivotably supporting member that fits on the rotating shaft and pivotably supports the rotating shaft;
  a rotating shaft seal that is arranged so as to be able to contact in a fitting state with both (i) an end surface of a member on an outer side in a radial direction of the rotating shaft and (ii) a surface of a member on an inner side of either the rotation shaft or the pivotably supporting member;
  the rotating shaft seal being movable between the partition and the rotating shaft, and possessing an annular portion; and
  wherein, in the closed valve state of the valve element, the rotating shaft seal moves in the radial direction of the rotation shaft due to a difference of pressures between a high fluid pressure that acts on one side of the valve element and a low fluid pressure that acts on the other side thereof and contacts with both the valve element and the rotation supporting portion on the high fluid pressure side.

2. The airtightness maintaining structure for a butterfly valve according to claim 1,
  wherein the rotation supporting portion has a pair of partition plates in a direction parallel to the valve element in the closed valve state and on both ends in a radial direction of the pivotably supporting member,
  the rotating shaft seal has a pair of first locking portions that project from the annular portion and a pair of second locking portions that are arranged in parallel with the first locking portions with a predetermined interval on both ends in a radial direction of the annular portion,
  the rotating shaft seal is arranged such that the partition plates are interposed between the first locking portions and the second locking portions, and
  the portions on the high fluid pressure side either the first locking portions or the second locking portions contact with the partition plates when the rotating shaft seal contacts with the valve element and the rotation supporting portion on the high fluid pressure side.

3. The airtightness maintaining structure for a butterfly valve according to claim 1,
  wherein the pivotably supporting member is located inwardly of the rotating shaft in a radial direction of the pivotably supporting member in the fitting state,
  the pivotably supporting member has a tapered portion facing to the rotating shaft on its outer circumferential surface, and
  the rotating shaft seal contacts with the tapered portion and the end surface of the rotating shaft.

4. The airtightness maintaining structure for a butterfly valve according to claim 1,
  wherein the rotating shaft is located outwardly of the pivotably supporting member in a radial direction of the pivotably supporting member in the fitting state, the rotating shaft seal has a first surface that contacts with the end surface of the rotating shaft by surface contact, and the first surface is perpendicular to the axis of the rotating shaft.

5. The airtightness maintaining structure for a butterfly valve according to claim 1, wherein the rotating shaft seal has a second surface that generates component forces in the axis direction of the rotating shaft and in a direction of movement in the radial direction of the rotating shaft, and the second surface is a tapered surface that is formed on an outer circumferential surface of the annular portion.

6. The airtightness maintaining structure for a butterfly valve according to claim 1, wherein the rotating shaft seal does not contact with at least the rotation supporting portion on the low fluid pressure side when the rotating shaft seal contacts with the valve element and the rotation supporting portion on the high fluid pressure side.

7. The airtightness maintaining structure for a butterfly valve according to claim 6, wherein the rotating shaft seal has a pair of first locking portions that project from the annular portion and a pair of second locking portions that are arranged in parallel with the first locking portion with a predetermined interval on both ends in a radial direction of the annular portion, the rotating shaft seal has inner circumferential side flat surfaces between the first locking portions and the second locking portions on an inner circumferential surface of the annular portion, and the inner circumferential surface has a cross-section with an oval shape.

8. The airtightness maintaining structure for a butterfly valve according to claim 3, wherein the end surface of the rotating shaft is a tapered surface facing to the pivotably supporting member, and the rotating shaft seal is provided between the tapered portion of the pivotably supporting member and the tapered surface of the rotating shaft.

9. An airtightness maintaining structure for a butterfly valve comprising:

a partition that includes an opening through which fluid passes;

a valve element including a valve body and a shaft which is rotatable, the valve element being attached to the shaft so that rotation of the shaft results in rotation of the valve element, the valve element being rotatable by virtue of rotation of the shaft between a closed valve state in which the valve element is positioned to close the opening in the partition and prevent fluid flow through the opening and an open valve state in which the valve element is positioned to open the opening in the partition and permit fluid flow through the opening;

a rotation supporting portion that includes a supporting member axially overlapping a portion of the shaft so that the supporting member pivotably supports the shaft;

a shaft seal movable in axial and radial directions between the partition and the shaft, the shaft seal including an annular portion and contacting, in a fitted state, both: (i) an end surface of a member radially outwardly of the rotating shaft; and (ii) a surface of a member located on an inner side of either the rotation shaft or the pivotably supporting member; and in the closed valve state of the valve element, the shaft seal moves in the radial direction of the rotation shaft due to a difference of pressures between a high fluid pressure acting on one side of the valve element and a low fluid pressure acting on an opposite side of the valve element so that the shaft seal contacts both the valve element and the rotation supporting portion on the high fluid pressure side.

10. The airtightness maintaining structure for a butterfly valve according to claim 9, the rotation supporting portion including two partition plates extending parallel to the valve element in the closed valve state, the two partition plates being spaced apart from each other in a radial direction of the pivotably supporting member;

the shaft seal including two first locking portions that project from the annular portion and two second locking portions that project from the annular portion, the second locking portions being parallel to the first locking portions and spaced apart from the first locking portions; and the rotating shaft seal being arranged such that each of the partition plates is positioned between one of the first locking portions and one of the second locking portions.

11. The airtightness maintaining structure for a butterfly valve according to claim 9, wherein the pivotably supporting member is located radially inwardly of the shaft, and a portion of an outer circumferential surface of the supporting member is tapered, the shaft seal contacting the tapered portion of the outer circumferential surface of the supporting member, and the shaft seal contacting the end surface of the shaft in the closed valve state of the valve element.

12. The airtightness maintaining structure for a butterfly valve according to claim 9, wherein the shaft is located radially outwardly of the pivotably supporting member in the fitting state, the shaft seal possessing a first surface that contacts the end surface of the rotating shaft in the closed valve state of the valve element, and the first surface is perpendicular to the axis of the rotating shaft.

13. The airtightness maintaining structure for a butterfly valve according to claim 9, wherein the shaft is located radially outwardly of the pivotably supporting member in the fitting state, the shaft seal possessing a first surface that contacts the end surface of the rotating shaft in the closed valve state of the valve element, and the first surface is perpendicular to the axis of the rotating shaft.

14. The airtightness maintaining structure for a butterfly valve according to claim 9, wherein the supporting member includes a columnar portion possessing a columnar-shaped outer circumferential surface and an axially adjacent tapered portion possessing a tapered outer circumferential surface, the shaft seal being mounted on the supporting member and contacting the tapered portion.

15. The airtightness maintaining structure for a butterfly valve according to claim 9, wherein the annular portion of the shaft seal possesses a tapering outer circumferential surface.

* * * * *